(12) United States Patent
Gleason et al.

(10) Patent No.: US 7,813,078 B1
(45) Date of Patent: Oct. 12, 2010

(54) DISK DRIVE LOAD/UNLOAD RAMP WITH INTEGRATED AIR FEATURES

(75) Inventors: Andrew J. Gleason, Longmont, CO (US); James A. Dunckley, Boulder, CO (US); Robert J. Miles, Longmont, CO (US)

(73) Assignee: Seagate Technology LLC, Scotts Valley, CA (US)

( * ) Notice: Subject to any disclaimer, the term of this patent is extended or adjusted under 35 U.S.C. 154(b) by 649 days.

(21) Appl. No.: 11/398,071

(22) Filed: Apr. 5, 2006

(51) Int. Cl.
*G11B 33/14* (2006.01)
*G11B 5/54* (2006.01)
*G11B 21/22* (2006.01)

(52) U.S. Cl. ............... 360/97.02; 360/254.5; 360/254.4

(58) Field of Classification Search ............... 360/254.7, 360/97.02, 254.8, 254.3, 254.4, 256.1, 97.03, 360/255, 254.5
See application file for complete search history.

(56) References Cited

U.S. PATENT DOCUMENTS

| | | | | |
|---|---|---|---|---|
| 5,898,545 A | * | 4/1999 | Schirle | 360/254.7 |
| 6,134,076 A | * | 10/2000 | Boutaghou et al. | 360/254.5 |
| 6,344,950 B1 | * | 2/2002 | Watson et al. | 360/254.3 |
| 6,480,361 B1 | * | 11/2002 | Patterson | 360/254.3 |
| 6,690,548 B2 | * | 2/2004 | Koyanagi et al. | 360/254.8 |
| 6,788,493 B1 | | 9/2004 | Subramaniam et al. | 360/97.02 |
| 6,987,640 B2 | | 1/2006 | Tsang et al. | 360/97.02 |
| 6,999,273 B2 | * | 2/2006 | Tsang et al. | 360/97.02 |
| 7,268,972 B2 | * | 9/2007 | Akama et al. | 360/97.02 |
| 7,746,599 B2 | * | 6/2010 | Kim et al. | 360/254.8 |

FOREIGN PATENT DOCUMENTS

JP      2004-171674 A  *  6/2004

* cited by examiner

*Primary Examiner*—Julie Anne Watko
(74) *Attorney, Agent, or Firm*—David C. Bohn; Westman, Champlin & Kelly, P.A.

(57) ABSTRACT

A disk drive (310) is disclosed that uses an integral load/unload ramp (350) with one or more integrated air features. In one embodiment, the load/unload ramp (350) includes a body (352), a plurality of head load/unload sections (354) for head parking operations, a plurality of air dams (370) for affecting the airflow on at least part of the primary data storage surfaces of the data storage disks (318) used by the disk drive (310), and a plurality of disk extenders (380) for affecting the airflow at the perimeter (320) of the various data storage disks (318). There is no joint of any kind between the body (352) and any of the head load/unload sections (354), between the body (352) and any of the air dams (370), or between the body (352) and any of the disk extenders (380).

19 Claims, 12 Drawing Sheets

DISK DRIVE LOAD/UNLOAD RAMP WITH INTEGRATED AIR FEATURES

CROSS-REFERENCE TO RELATED APPLICATIONS

This patent application claims priority under 35 U.S.C. §119(e) to U.S. Provisional Patent Application Ser. No. 60/670,067, that was filed on Apr. 11, 2005, that is entitled "RAMP WITH INTEGRATED AIR FEATURES FOR HARD DISK DRIVE," and the entire disclosure of which is hereby incorporated by reference in its entirety herein.

FIELD OF THE INVENTION

The present invention generally relates to the field of disk drives that use a load/unload ramp for head parking operations and, more particularly, to a load/unload ramp in the form of a single, common structure that includes one or more head load/unload sections, along with at least one or more air dams and/or one or more disk extenders.

BACKGROUND OF THE INVENTION

There may be a number of ways to categorize disk drive configurations/types. One is by how any heads (e.g., the read/write transducer(s)) of the disk drive are parked at the end of disk drive operations. Two disk drive configuration in this regard are commonly referred to as a "dynamic load/unload type" and a "contact start/stop type". In the case of a dynamic load/unload disk drive, the head positioner assembly is moved to a "parked position" at the termination of disk drive operations to dispose each slider in vertically spaced relation to its corresponding disk via a load/unload ramp. Various configurations of load/unload ramps exist. In the case of a contact start/stop type disk drive, the head positioner assembly typically moves in a direction to dispose each slider typically toward an inner, non-data storage region of the corresponding data storage disk. Terminating the rotation of the data storage disk(s) in this type of disk drive configuration results in each of its sliders actually establishing contact with or "landing" on their corresponding data storage disk, and the slider remains on the disk until disk drive operations are re-initiated.

Vibrations may have an adverse affect on one or more aspects of disk drive operations. One potential source of vibrations is the airflow within the interior of the drive that is created by this rotation of each of the data storage disks used by the disk drive. As the rotational speed of the data storage disks has increased over time, so to has the airflow within the disk drive. These airflows have been addressed in a variety of manners. Air dams that extend over the primary data storage surfaces of the various data storage disks have at least been proposed for use by disk drives. Disk extenders that are disposed along the perimeter of each of the data storage disks have also at least been proposed for use by disk drives.

BRIEF SUMMARY OF THE INVENTION

A first aspect of the present invention is generally directed to a disk drive load/unload ramp that includes a body, a first head load/unload section, a first air dam, and a first disk extender, where the body, the first head load/unload section, the first air dam, and the first disk extender are in the form of an integral, one-piece structure. When this load/unload ramp is installed in a disk drive: 1) the first head load/unload section is available for interacting with a corresponding head-gimbal assembly to move its head away from the corresponding data storage disk during a parking operation; 2) the first air dam is aligned with and spaced from a primary data storage surface of at least one data storage disk of the disk drive; and 3) the first disk extender includes a disk extender surface that is disposed beyond and aligned with a perimeter of the corresponding data storage disk of the disk drive, and further that is at least substantially parallel with a corresponding portion of the perimeter of its corresponding data storage disk.

Various refinements exist of the features noted in relation to the first aspect of the present invention. Further features may also be incorporated in the first aspect of the present invention as well. These refinements and additional features may exist individually or in any combination. Each of the first head load/unload section, the first air dam, and the first disk extender may be of any appropriate size, shape, and/or configuration, and may be formed from any appropriate material or combination of materials. In the case where the disk drive that incorporates the load/unload ramp is disposed on a horizontal surface, the first air dam may extend over the uppermost data storage disk used by the disk drive, may be disposed between an adjacent pair of data storage disks used by the disk drive, or may be disposed below the lowermost data storage disk used by the disk drive. Stated another way, the first air dam may be disposed above and/or below any corresponding data storage disk of the disk drive, and further in spaced relation thereto, when each data storage disk of the disk drive is disposed in a horizontal orientation.

The disk extender surface of the first disk extender used by the load/unload ramp of the first aspect may also be characterized as being disposed radially outwardly from a perimeter of its corresponding data storage disk when the load/unload ramp is installed in a disk drive. The disk extender surface of the first disk extender may be characterized as being arcuately-shaped between a fixed end thereof and a free end thereof, may be characterized as being concave between a fixed end thereof and a free end thereof, or both. In one embodiment, the disk extender surface extends about at least a portion of the perimeter of the corresponding data storage disk so as to be disposed outwardly from at least a substantial portion of its corresponding disk drive suspension when the load/unload ramp is installed in a disk drive.

With the body, first head load/unload section, first air dam, and first disk extender of the load/unload ramp of the first aspect being in the form of an integral, one-piece structure, the load/unload ramp lacks any joint between the body and each of the first head load/unload section, the first air dam, and the first disk extender. In one embodiment, the load/unload ramp lacks any joint between the body and each first head load/unload section used by the load/unload ramp, lacks any joint between the body and each first air dam used by the load/unload ramp, and lacks any joint between the body and each first disk extender used by the load/unload ramp. In one embodiment, the load/unload ramp is in the form of a molded part. However, the load/unload ramp may be fabricated in any manner that yields the desired integral, one-piece structure having the noted functionality.

The load/unload ramp of the first aspect may include a plurality of first head load/unload sections that are spaced in a first dimension (e.g., vertically when a disk drive that incorporates this load/unload ramp is disposed on a horizontal surface), a plurality of first air dams that are also spaced in this first dimension, and a plurality of first disk extenders that are also spaced in this first dimension. Any appropriate number of first head load/unload sections, first air dams, and first disk extenders may be used by the load/unload ramp.

A second aspect of the present invention is generally directed to a disk drive load/unload ramp that includes a body, a first head load/unload section, and a first air dam, where the body, the first head load/unload section, and the first air dam are in the form of an integral, one-piece structure. When this load/unload ramp is installed in a disk drive: 1) the first head load/unload section is available for interacting with a corresponding head-gimbal assembly to move its head away from the corresponding data storage disk during a parking operation; and 2) the first air dam is aligned with and spaced from a primary data storage surface of at least one data storage disk of the disk drive.

Various refinements exist of the features noted in relation to the second aspect of the present invention. Further features may also be incorporated in the second aspect of the present invention as well. These refinements and additional features may exist individually or in any combination. Each of the first head load/unload section and the first air dam may be of any appropriate size, shape, and/or configuration, and may be formed from any appropriate material or combination of materials. In the case where the disk drive that incorporates the load/unload ramp is disposed on a horizontal surface, the first air dam may extend over the uppermost data storage disk used by the disk drive, may be disposed between an adjacent pair of data storage disks used by the disk drive, or may be disposed below the lowermost data storage disk used by the disk drive. Stated another way, the first air dam may be disposed above and/or below any corresponding data storage disk of the disk drive, and further in spaced relation thereto, when each data storage disk of the disk drive is disposed in a horizontal orientation.

The load/unload ramp of the second aspect may include a plurality of first head load/unload sections that are spaced in a first dimension (e.g., vertically when a disk drive that incorporates this load/unload ramp is disposed on a horizontal surface), as well a plurality of first air dams that are also spaced in this first dimension. Any appropriate number of first head load/unload sections and first air dams may be used by the load/unload ramp.

With the body, first head load/unload section, and first air dam of the load/unload ramp of the second aspect being in the form of an integral, one-piece structure, the load/unload ramp lacks any joint between the body and each of the first head load/unload section and the first air dam. In one embodiment, the load/unload ramp lacks any joint between the body and each first head load/unload section used by the load/unload ramp, and further lacks any joint between the body and each first air dam used by the load/unload ramp. In one embodiment, the load/unload ramp is in the form of a molded part. However, the load/unload ramp may be fabricated in any manner that yields the desired integral, one-piece structure having the noted functionality.

The load/unload ramp of the second aspect may also include a first disk extender, which in turn includes a disk extender surface. This first disk extender may be of any appropriate size, shape, and/or configuration, and may be formed from any appropriate material or combination of materials. When this particular load/unload ramp configuration is installed in a disk drive, the to disk extender surface of the first disk extender is disposed beyond and aligned with a perimeter of the corresponding data storage disk of the disk drive, and further is at least substantially parallel with a corresponding portion of the perimeter of its corresponding data storage disk. The disk extender surface of the first disk extender may be characterized as being disposed radially outwardly from a perimeter of its corresponding data storage disk when this particular load/unload ramp configuration is installed in a disk drive. The disk extender surface of the first disk extender also may be characterized as being arcuately-shaped between a fixed end thereof and a free end thereof, may be characterized as being concave between a fixed end thereof and a free end thereof, or both. In one embodiment, the disk extender surface extends about at least a portion of the perimeter of the corresponding data storage disk so as to be disposed outwardly from at least a substantial portion of its corresponding disk drive suspension when the load/unload ramp is installed in a disk drive.

The above-noted configuration for the load/unload ramp of the second aspect may include a plurality of first head load/unload sections that are spaced in a first dimension (e.g., vertically when a disk drive that incorporates this load/unload ramp is disposed on a horizontal surface), a plurality of first air dams that are also spaced in this first dimension, and a plurality of first disk extenders that are also spaced in this first dimension. Any appropriate number of first head load/unload sections, first air dams, and first disk extenders may be used by the above-noted load/unload ramp configuration.

In one embodiment, the body, the first head load/unload section, the first air dam, and the first disk extender used by the above-noted configuration for the load/unload of the second aspect is in the form of an integral, one-piece structure. With the body, first head load/unload section, first air dam, and first disk extender being in the form of an integral, one-piece structure in this case, the above-noted load/unload ramp configuration lacks any joint between the body and each of the first head load/unload section, the first air dam, and the first disk extender. In one embodiment, the above-noted load/unload ramp configuration lacks any joint between the body and each first head load/unload section used by this load/unload ramp, lacks any joint between the body and each first air dam used by this load/unload ramp, and lacks any joint between the body and each first disk extender used by this load/unload ramp. In one embodiment, the above-noted load/unload ramp configuration is in the form of a molded part. However, the above-noted load/unload ramp configuration may be fabricated in any manner that yields the desired integral, one-piece structure having the noted functionality.

A third aspect of the present invention is generally directed to a disk drive load/unload ramp that includes a body, a first head load/unload section, and a first disk extender, where the body, the first head load/unload section, and the first disk extender are in the form of an integral, one-piece structure. When this load/unload ramp is installed in a disk drive: 1) the first head load/unload section is available for interacting with a corresponding head-gimbal assembly to move its head away from the corresponding data storage disk during a parking operation; and 2) the first disk extender includes a disk extender surface that is disposed beyond and aligned with a perimeter of the corresponding data storage disk of the disk drive, and further that is at least substantially parallel with a corresponding portion of the perimeter of its corresponding data storage disk.

Various refinements exist of the features noted in relation to the third aspect of the present invention. Further features may also be incorporated in the first aspect of the present invention as well. These refinements and additional features may exist individually or in any combination. Each of the first head load/unload section and the first disk extender may be of any appropriate size, shape, and/or configuration, and may be formed from any appropriate material or combination of materials. The disk extender surface of the first disk extender may also be characterized as being disposed radially outwardly from a perimeter of its corresponding data storage disk when the load/unload ramp is installed in a disk drive.

The disk extender surface of the first disk extender may be characterized as being arcuately-shaped between a fixed end thereof and a free end thereof, may be characterized as being concave between a fixed end thereof and a free end thereof, or both. In one embodiment, the disk extender surface extends about at least a portion of the perimeter of the corresponding data storage disk so as to be disposed outwardly from at least a substantial portion of its corresponding disk drive suspension when the load/unload ramp is installed in a disk drive.

The load/unload ramp of the third aspect may include a plurality of first head load/unload sections that are spaced in a first dimension (e.g., vertically when a disk drive that incorporates this load/unload ramp is disposed on a horizontal surface), as well as a plurality of first disk extenders that are also spaced in this first dimension. Any appropriate number of first head load/unload sections and first disk extenders may be used by the load/unload ramp.

With the body, first head load/unload section, and first disk extender of the load/unload ramp of the third aspect being in the form of an integral, one-piece structure, the load/unload ramp lacks any joint between the body and each of the first head load/unload section and the first disk extender. In one embodiment, the load/unload ramp lacks any joint between the body and each first head load/unload section used by the load/unload ramp, and further lacks any joint between the body and each first disk extender used by the load/unload ramp. In one embodiment, the load/unload ramp is in the form of a molded part. However, the load/unload ramp may be fabricated in any manner that yields the desired integral, one-piece structure having the noted functionality.

The load/unload ramp of the third aspect may also include a first air dam. When this particular load/unload ramp configuration is installed in a disk drive, the first air dam is aligned with and spaced from a primary data storage surface of at least one data storage disk of the disk drive. In the case where a disk drive is disposed on a horizontal surface and incorporates this particular load/unload ramp configuration, the first air dam may extend over the uppermost data storage disk used by the disk drive, may be disposed between an adjacent pair of data storage disks used by the disk drive, or may be disposed below the lowermost data storage disk used by the disk drive. Stated another way, the first air dam may be disposed above and/or below any corresponding data storage disk of the disk drive, and further in spaced relation thereto, when each data storage disk of the disk drive is disposed in a horizontal orientation.

The above-noted configuration for the load/unload ramp of the third aspect may include a plurality of first head load/unload sections that are spaced in a first dimension (e.g., vertically when a disk drive that incorporates this load/unload ramp is disposed on a horizontal surface), a plurality of first air dams that are also spaced in this first dimension, and a plurality of first disk extenders that are also spaced in this first dimension. Any appropriate number of first head load/unload sections, first air dams, and first disk extenders may be used by the above-noted load/unload ramp configuration.

In one embodiment, the body, the first head load/unload section, the first air dam, and the first disk extender used by the above-noted configuration for the load/unload ramp of the third aspect is in the form of an integral, one-piece structure. With the body, first head load/unload section, first air dam, and first disk extender being in the form of an integral, one-piece structure in this case, the above-noted load/unload ramp configuration lacks any joint between the body and each of the first head load/unload section, the first air dam, and the first disk extender. In one embodiment, the above-noted load/unload ramp configuration lacks any joint between the body and each first head load/unload section used by this load/unload ramp, lacks any joint between the body and each first air dam used by this load/unload ramp, and lacks any joint between the body and each first disk extender used by this load/unload ramp. In one embodiment, the above-noted load/unload ramp configuration is in the form of a molded part. However, the above-noted load/unload ramp configuration may be fabricated in any manner that yields the desired integral, one-piece structure having the noted functionality.

DETAILED DESCRIPTION OF THE INVENTION

Figure 1:
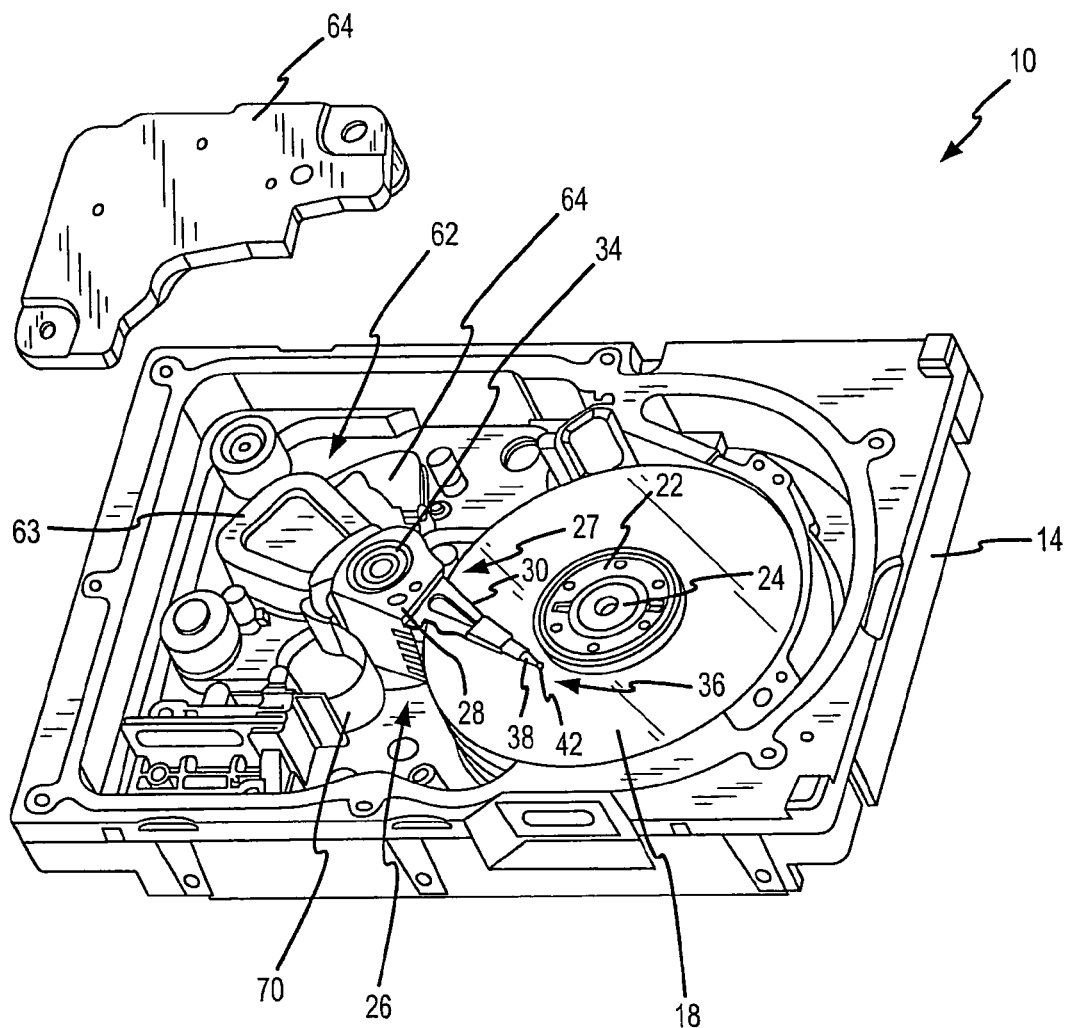
FIG. 1 is a perspective view of a prior art disk drive that may be adapted to include a disk drive load/unload ramp with integrated air features.
Figure 2:
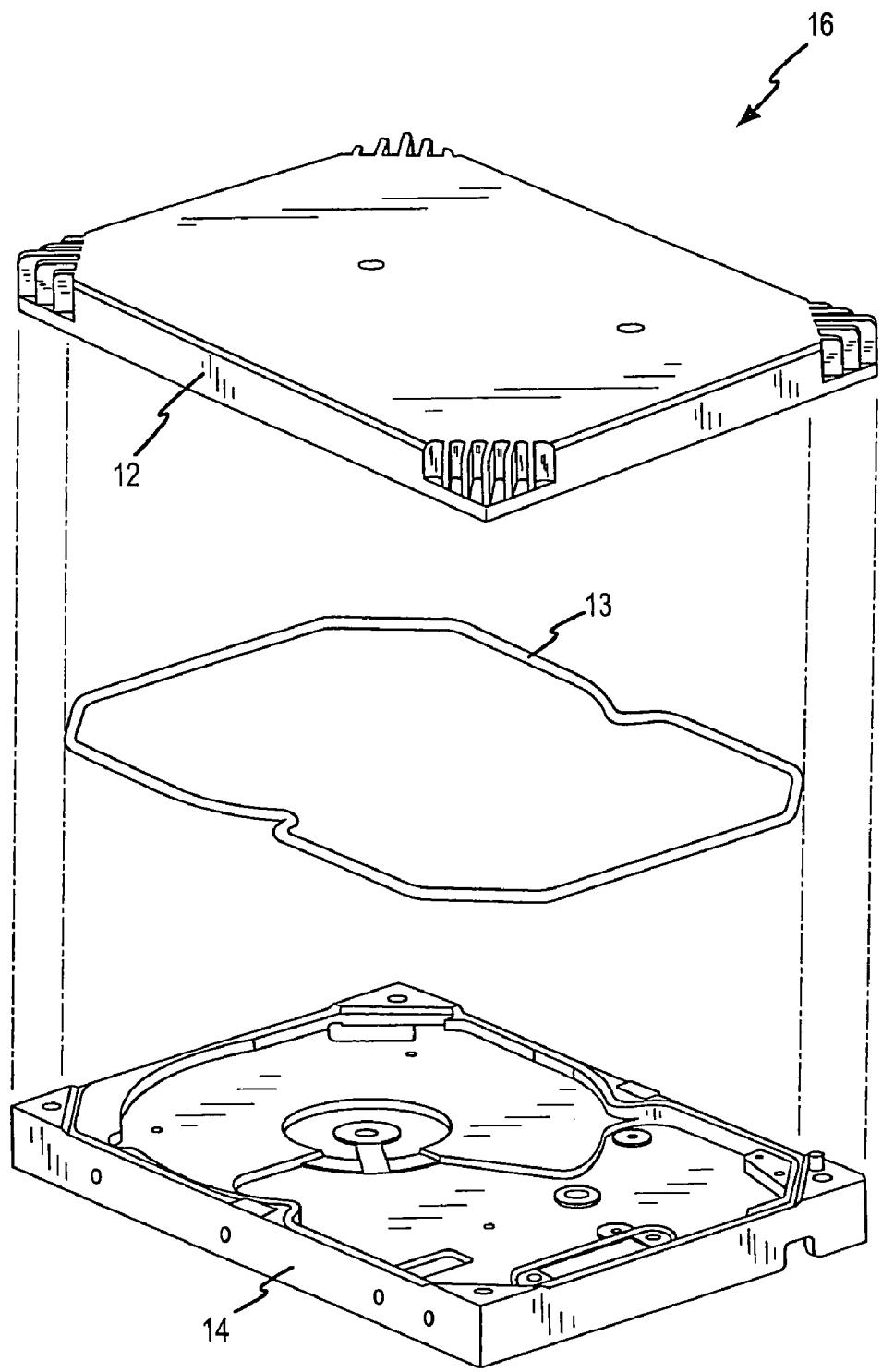
FIG. 2 is an exploded, perspective view of a prior art disk drive housing for the disk drive of FIG. 1.

One embodiment of a prior art disk drive 10 is illustrated in FIGS. 1-4. However, this disk drive 10 may be adapted to incorporate a load/unload ramp with one or more integrated air features and that will be discussed below in relation to FIGS. 7A-D, FIGS. 8A-B, and FIGS. 9A-B, such adaptations not being known to be in the prior art. The disk drive 10 generally includes a disk drive housing 16 of any appropriate configuration that defines an enclosed space for the various disk drive components. Here the housing 16 includes a base plate 14 that is typically detachably interconnected with a cover 12. A suitable gasket 13 may be disposed between the cover 12 and the base plate 14 to enhance the seal therebetween.

The disk drive 10 includes one or more data storage disks 18 of any appropriate computer-readable data storage media. Typically both of the major surfaces of each data storage disk 18 include a plurality of concentrically disposed tracks for data storage purposes. Each disk 18 is mounted on a hub by a disk clamp 22, and the hub is rotatably interconnected with the disk drive base plate 14 and/or cover 12. A spindle motor rotates the hub and attached clamp 22 about a shaft 24 of the spindle motor to simultaneously spin the data storage disk(s) 18 at an appropriate rate.

The disk drive 10 also includes a head positioner assembly 26, that in turn includes an actuator 27. The actuator 27 is in the form of an actuator body 28 having one or more individual rigid actuator arms 30 extending therefrom. This actuator body 28 is mounted on a pivot bearing 34. Each actuator arm 30 pivots about the pivot bearing 34, which in turn is rotatably supported by the base plate 14 and/or cover 12. Multiple actuator arms 30 are disposed in vertically spaced relation, with one actuator arm 30 typically being provided for each major data storage surface of each data storage disk 18 of the disk drive 10. Other actuator configurations could be utilized as well, such as an "E" block having one or more rigid actuator arm tips or the like that cantilever from a common structure, or one or more rigid actuator arms that are each mounted on the pivot bearing 34.

Movement of the head positioner assembly 26 is provided by an appropriate head stack assembly drive, such as a voice coil motor 62 or the like. The voice coil motor 62 may be characterized as a rotary drive. The voice coil motor 62 is a magnetic assembly that controls the movement of the head positioner assembly 26 under the direction of control electronics 66. Typical components of the voice coil motor 62 are a coil 63 that may be mounted on the head positioner assembly 26, and a separate voice coil motor magnet assembly, ("VCM magnet assembly") 64 that is disposed above and below this coil 63 (the upper VCM magnet assembly 64 being "exploded away" in FIG. 1). The VCM magnet assemblies 64 will typically be mounted on the housing 16 in a fixed position, with the upper VCM magnet assembly 64 being appropriately supported above the lower VCM magnet assembly. Any appropriate head positioner assembly drive type may be utilized by the disk drive 10, including a linear drive (for the case where the head positioner assembly 26 is interconnected with the base plate 14 and/or cover 12 for linear movement versus the illustrated pivoting movement about the pivot bearing 34), as well as other types of rotational/pivoting drives.

What may be characterized as a head-gimbal assembly or HGA 36 is interconnected with each actuator arm 30 and includes a load beam or suspension 38 that is attached to the free end of each actuator arm 30 or actuator arm tip, and cantilevers therefrom. All HGAs 36 are part of the head positioner assembly 26. Typically the suspension 38 of each HGA 36 is biased at least generally toward its corresponding disk 18 by a spring-like force. A slider 42 is disposed at or near the free end of each suspension 38. What is commonly referred to in the art as the "head" 44 (e.g., at least one transducer) is appropriately mounted on the slider 42 and is used in disk drive read/write operations. Various types of read/write technologies may be utilized by the head 44 on the slider 42. In any case, the biasing forces exerted by the suspension 38 on its corresponding slider 42 thereby attempt to move the slider 42 in the direction of its corresponding disk 18. Typically this biasing force is such that if the slider 42 were positioned over its corresponding disk 18, without the disk 18 being rotated at a sufficient velocity, the slider 42 would be in contact with the disk 18.

Each head 44 is interconnected with the control electronics 66 of the disk drive 10 by a flex cable 70 that is typically mounted on the head positioner assembly 26. Signals are exchanged between the head 44 on the slider 42 and its corresponding data storage disk 18 for disk drive read and/or write operations. In this regard, the voice coil motor 62 pivots the actuator arm(s) 30 to simultaneously move each head 44 on its slider 42 "across" the corresponding data storage disk 18 to position the head 44 at the desired/required radial position on the disk 18 (i.e., at the correct track on the data storage disk 18) for disk drive read/write operations.

When the disk drive 10 is not in operation, the head positioner assembly 26 is pivoted to a "parked position" to dispose each slider 42 in a desired position relative to its corresponding data storage disk 18. The "parked position" may be at least generally at or more typically beyond a perimeter of its corresponding data storage disk 18 or at a more interior location of the corresponding disk 18, but in any case typically in vertically spaced relation to its corresponding disk 18. This is commonly referred to in the art as being a dynamic load/unload disk drive configuration. In this regard, the disk drive 10 may include a ramp assembly that is disposed beyond a perimeter of the data storage disk 18 to typically both move the corresponding slider 42 vertically away from its corresponding data storage disk 18 and to also exert somewhat of a retaining force on the corresponding actuator arm 30. Any configuration for the ramp assembly that provides the desired "parking" function may be utilized. The disk drive 10 could also be configured to be of the contact start/stop type, where each actuator arm 30 would pivot in a direction to dispose the slider(s) 42 typically toward an inner, non-data storage region of the corresponding data storage disk 18. Terminating the rotation of the data storage disk(s) 18 in this type of disk drive configuration would then result in the slider(s) 42 actually establishing contact with or "landing" on their corresponding data storage disk 18, and the slider 42 would remain on the disk 18 until disk drive operations are re-initiated. In either configuration, it may be desirable to at least attempt to retain the actuator arm(s) 30 in this parked position if the disk drive 10 is exposed to a shock event. In this regard, the disk drive 10 may include an actuator arm assembly latch that moves from a non-latching position to a latching position to engage an actuator arm 30 so as to preclude the same from pivoting in a direction which would tend to drag the slider(s) 42 across its corresponding data storage disk 18.

Figure 3:
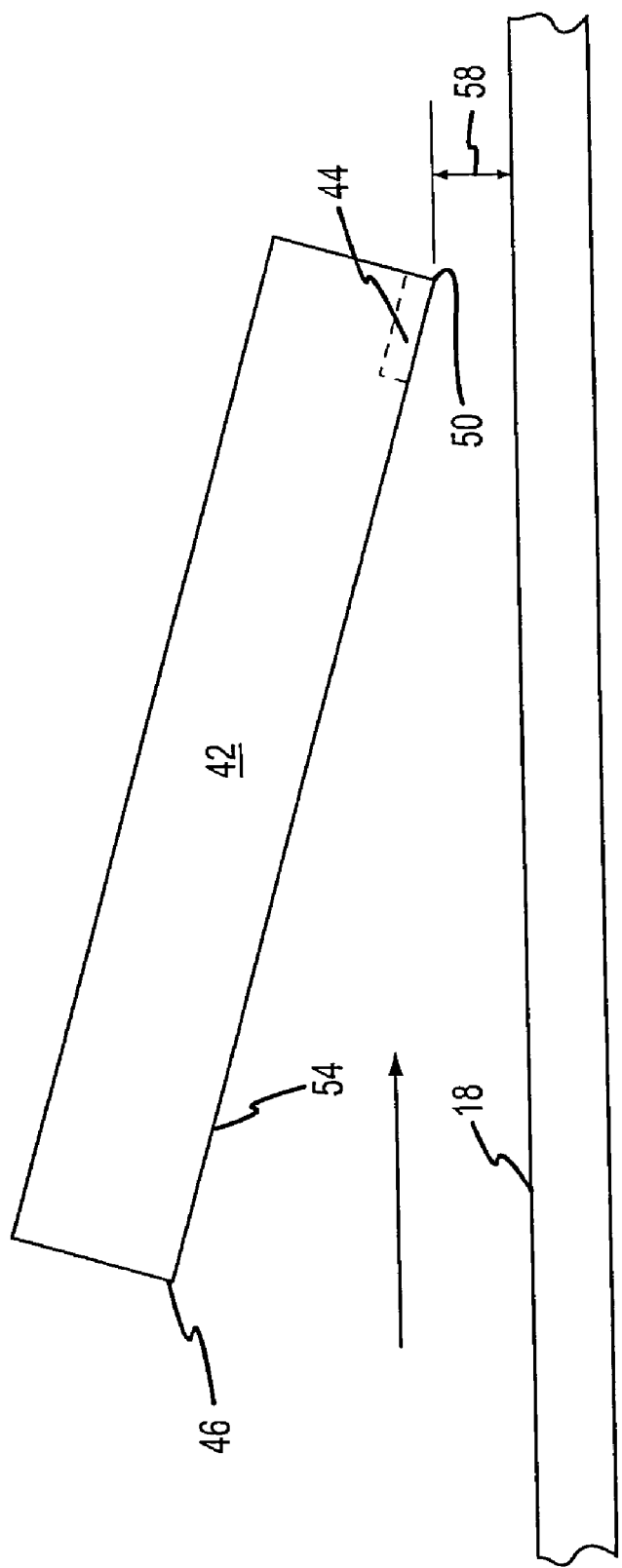
FIG. 3 is a schematic representation of a prior art flying-type slider that may be used by the disk drive of FIG. 1.

The slider 42 of the disk drive 10 may be configured to "fly" on an air bearing during rotation of its corresponding data storage 18 at a sufficient velocity. This is schematically illustrated in FIG. 3 where a lower surface 54 of the slider 42 would include an appropriate air-bearing-surface (ABS) system (not shown). Here the direction of the rotation of the disk 18 relative to the slider 42 is represented by the arrow, while the fly height of the slider 42 is represented by reference numeral 58 (measured from a reference plane of the mean of the surface roughness of the disk 18). In FIG. 3, the slider 42 is disposed at a pitch angle such that its leading edge 46 of the slider 42 is disposed further from its corresponding data storage disk 18 than its trailing edge 50. The transducer(s) 44 would typically be incorporated on the slider 42 at least generally toward its trailing edge 50 since this is positioned closest to its corresponding disk 18. Other pitch angles could be utilized for flying the slider 42. The disk drive 10 could also be configured for contact or near-contact recording (not shown).

Figure 4:
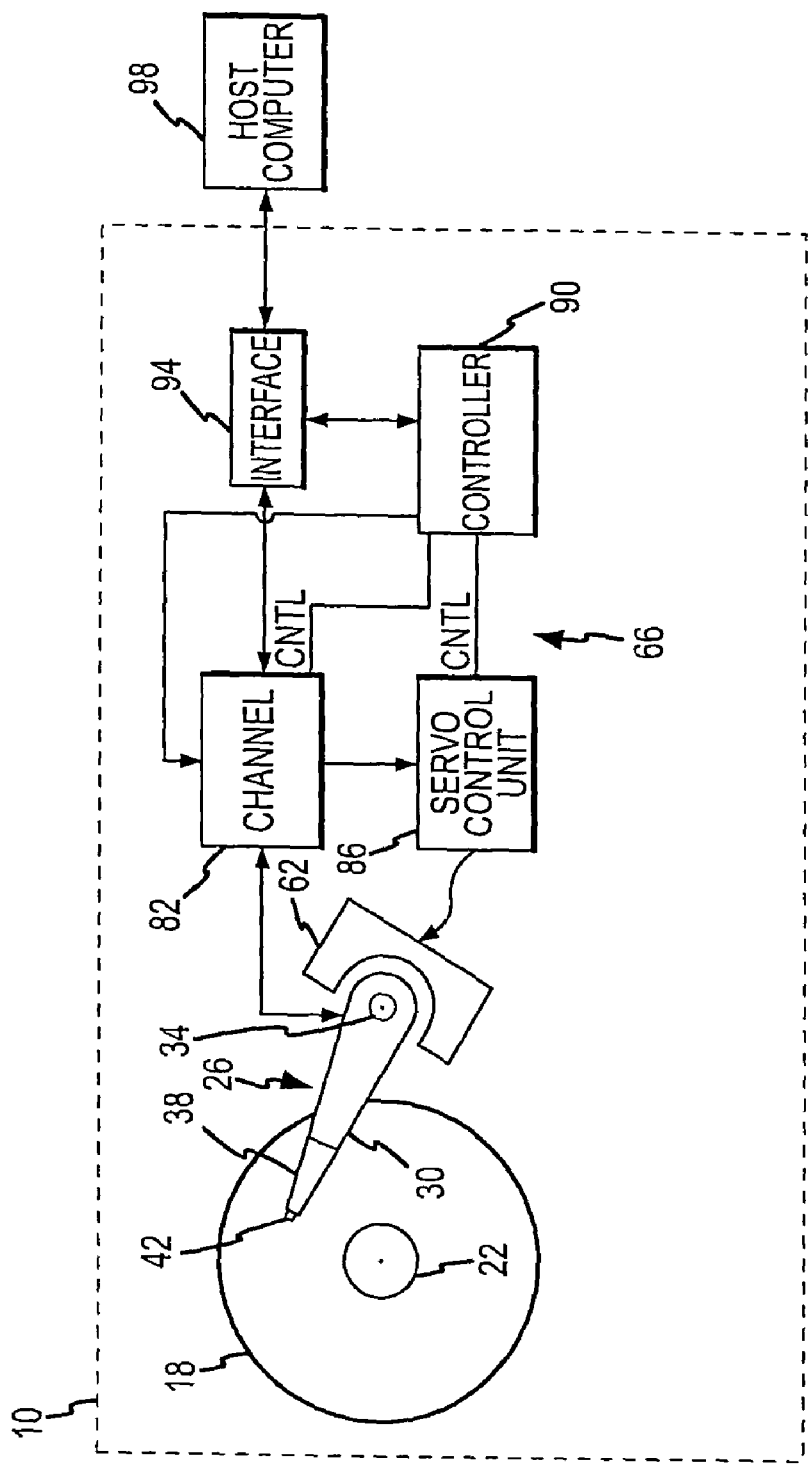
FIG. 4 is a simplified prior art electrical component block diagram of the disk drive of FIG. 1.

FIG. 4 illustrates a simplified electrical component block diagram of the disk drive 10 of FIG. 1. The control electronics 66 in this case includes a controller 90 and a servo control unit 86. The disk drive 10 in FIG. 4 also includes a channel 82, as well as an interface 94 for interconnecting the disk drive 10 with a host computer 98. During operation of the disk drive 10, the data storage disk 18 rotates. Data is stored on the data storage disk 18 in substantially concentric tracks. Data may be read from or written to the data storage disk 18 by moving the slider 42 and its head 44 to the desired track and performing the desired communication operation (i.e., a read or write operation). In one embodiment, the data storage disk 18 includes a magnetic media having concentric read/write tracks and the head 44 includes at least one transducer that is capable of communicating with this magnetic data storage disk 18.

The voice coil motor 62 receives servo control information from the servo control unit 86 to cause the voice coil motor 62 to move each actuator arm 30 and its corresponding head 44 when repositioning of the head(s) 44 is desired/required. In this regard, the head(s) 44 may periodically read positioning information from the surface of the corresponding data storage disk 18 and transmit the positioning information to the servo control unit 86 via the channel 82. The servo control unit 86 compares the present position of the head(s) 44 to a desired position, with movement of the actuator arm(s) 30 being made as required for proper track alignment.

The channel 82 receives a number of inputs for processing so that data may be manipulated by the devices internal and external, such as the host computer 98, which is again interconnected with the disk drive 10 via the interface 94. One operation of the channel 82 is to receive an analog signal from the head(s) 44 and to convert the analog signal to a digital signal recognized by the host computer 98. In addition, the channel 82 facilitates the storage of information from the host computer 98 to the data storage disk(s) 18 by encoding data signals from the host computer 98 and creating a write signal, from the encoding data, which is transmitted to the head(s) 44 for storage on the corresponding data storage disk 18.

The controller 90 controls the timing and operation of other elements of the disk drive 10. The controller 90 receives input/output requests from the host computer 98 via the interface 94. Based on the input to the controller 90, the controller 90 delivers appropriate commands to the servo control unit 86 and the channel 82. For example, in a read operation, the controller 90 commands the servo control unit 86 to move the head(s) 44 to the desired track on the corresponding data storage disk 18 such that the data written on the disk 18 may be transferred to the host computer 98. Accordingly, the servo control unit 86 moves the head(s) 44 to the desired track on the corresponding data storage disk 18 using the servo positioning information read from the data storage disk 18 by the corresponding head 44. In turn, the head(s) 44 reads the information from the corresponding data storage disk 18 and transmits information to the channel 82 that converts the information so that it may be interpreted by the host computer 98.

Figure 5:
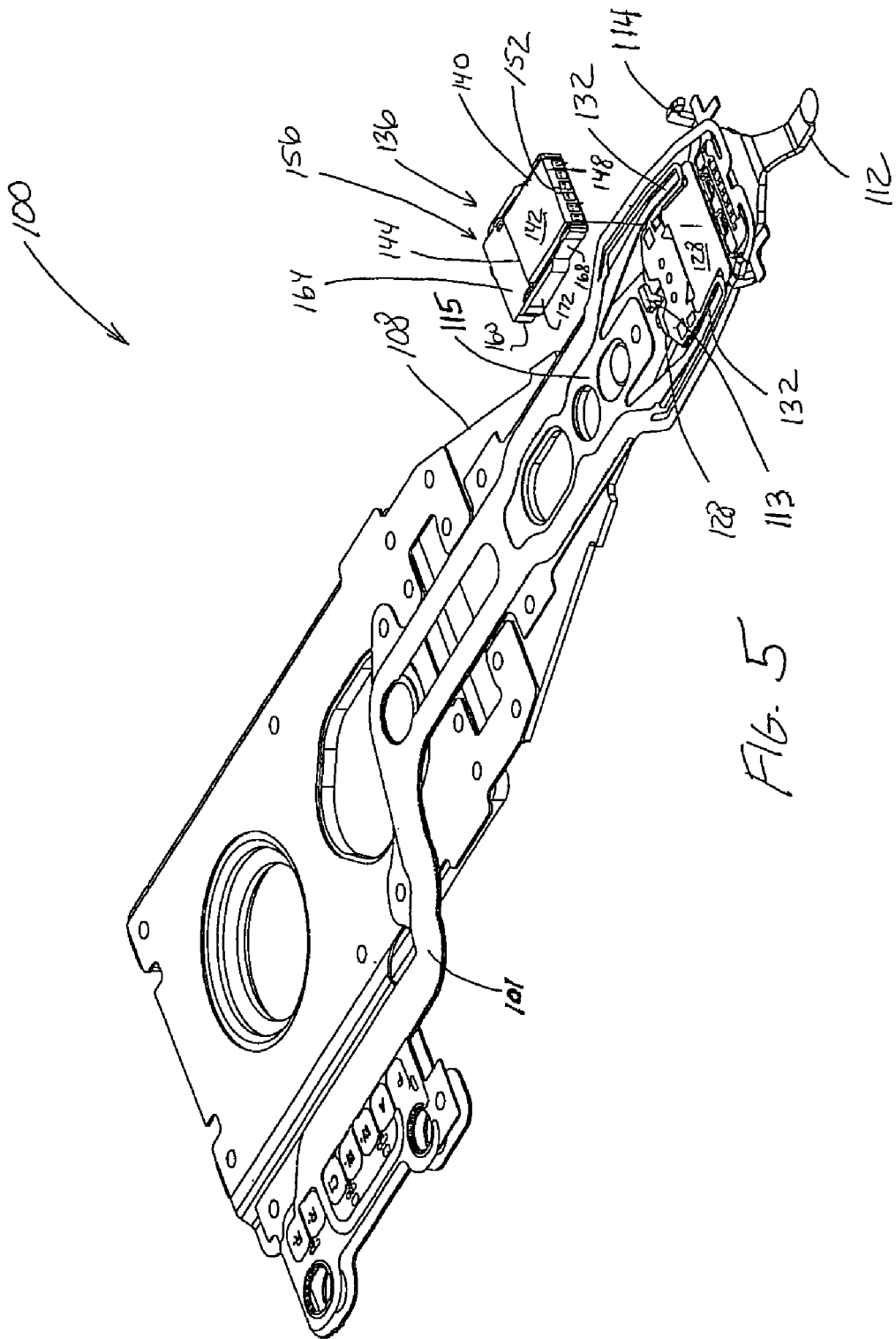
FIG. 5 is a perspective view of a head-gimbal assembly that may be used by the disk drive of FIG. 1.

One embodiment of a head-gimbal assembly that may be used in place of the head-gimbal assembly 36 in the disk drive 10 is illustrated in FIG. 5 and is identified by reference numeral 100. The head-gimbal assembly 100 generally includes a suspension 108, an electrical trace assembly or a flex cable 101, a flexure 115 that includes a flexure 128, and what may be characterized as a slider assembly 136. The suspension 108, flex cable 101, and flexure 115 may be of any appropriate size, shape, and/or configuration, and may be characterized as a suspension assembly. Generally, the suspension 108 biases the slider assembly 136 toward its corresponding data storage disk; the flexure 115 provides a desired interconnection between the slider assembly 136 and the suspension 108; the flex cable 101 provides electrical signals to and receives electrical signals from the slider assembly 136 (in relation to each of its slider positioner 156 and its slider 140); and the slider assembly 136 communicates with its corresponding data storage disk.

The flexure 115 is appropriately mounted on the suspension 108 at one or more locations, and includes a pair of deflectable gimbal legs 132 to movably support the slider assembly 136 relative to the suspension 108. In this regard, the flexure 115 further includes a flexure tongue 128 that is supported by the gimbal legs 132. The flexure tongue 128 at least generally pivots about at least somewhat of a predefined axis relative to the gimbal legs 132. Typically, this pivot axis will be at least generally perpendicular to the long axis of the suspension 108. A dimple or other protrusion (not shown) is included on the suspension 108 and engages the side of the flexure tongue 128 that is opposite the side on which the slider assembly 136 is mounted.

The suspension 108 includes both a leading edge limiter 113 and a trailing edge limiter 114 to establish a maximum displacement of the leading and trailing edges, respectively, of the flexure tongue 128 relative to the suspension 108. The suspension 108 also includes a lift tab 112 for use in parking the head-gimbal assembly 100. Engagement of this lift tab 112 with an appropriate load/unload ramp exerts a force on the suspension 108 to increase the vertical spacing between the slider assembly 136 and its corresponding data storage disk. The leading edge limiter 113 and/or trailing edge limiter 114 of the suspension 108 may engage the flexure 115 at this time, as a suction force may still be "pulling" the slider 140 toward its corresponding data storage disk during a parking operation.

The slider assembly 136 is mounted on the flexure tongue 128 such that the trailing edge of the slider assembly 136 is disposed at or close to the hinge of the flexure tongue 128. There are two main components of the slider assembly 136—a slider 140 and what may be characterized as a slider position control microactuator or slider positioner 156. The slider 140 may be of any appropriate size, shape, and/or configuration. Generally, the slider 140 includes an air bearing surface 142 (the surface of the slider 140 that projects toward its corresponding data storage disk during disk drive operations, and that is contoured to exert forces on the slider 140 to allow it to "fly" above its corresponding data storage disk during disk drive operations, typically in closely spaced relation), a leading edge 144, a trailing edge 148, and a read/write head 152. The fluid (e.g., air) flows relative to the slider 140 from its leading edge 144 to its trailing edge 148 during disk drive operations. The illustrated slider 140 is of the "flying type," and its leading edge 144 will be spaced further from its corresponding data storage disk than its trailing edge 148 during disk drive operations. The leading edge 144 of the slider 140 is allowed to move further away from its corresponding data storage disk than the trailing edge 148 of the slider 140 by a pivoting of the flexure tongue 128 at least generally about an axis.

The slider positioner 156 is used to position the slider 140 (more specifically its read/write head 152) relative to a certain track of the corresponding data storage disk. The slider positioner 156 is generally in the form of a frame 160 and a pair of actuators 172. The frame 160 is appropriately mounted on the flexure tongue 128, and includes a base 164, as well as a pair of arms 168 that are spaced along the base 164, that each cantilever from the base 164, and that are able to move relative to the flexure tongue 128.

The slider 140 is positioned within the space collectively defined by the pair of arms 168 and the base 164 of the frame 160 of the slider positioner 156. Typically, there will be a space between the slider 140 and each of the arms 168, as well as a space between the leading edge 144 of the slider 140 and the base 164. A first material (e.g., an epoxy or adhesive) is used to fix a portion of the slider 140 to each of the arms 168. This first material is typically disposed toward the free ends of the arms 168.

An actuator 172 is provided for each of the arms 168 of the frame 160, and each is in the form of what may be characterized as a piezoelectric element (e.g., a plurality of piezoelectric layers, along with appropriate electrode layers. The actuators 172 may be operated to exert a force on their corresponding arm 168 to deflect the same relative to the base 164 of the frame 160. This of course changes the position of the slider 140 relative to the base 164 and flexure tongue 128, and more pertinently changes the position of its read/write head 152 relative to its corresponding data storage disk.

Figure 6A:
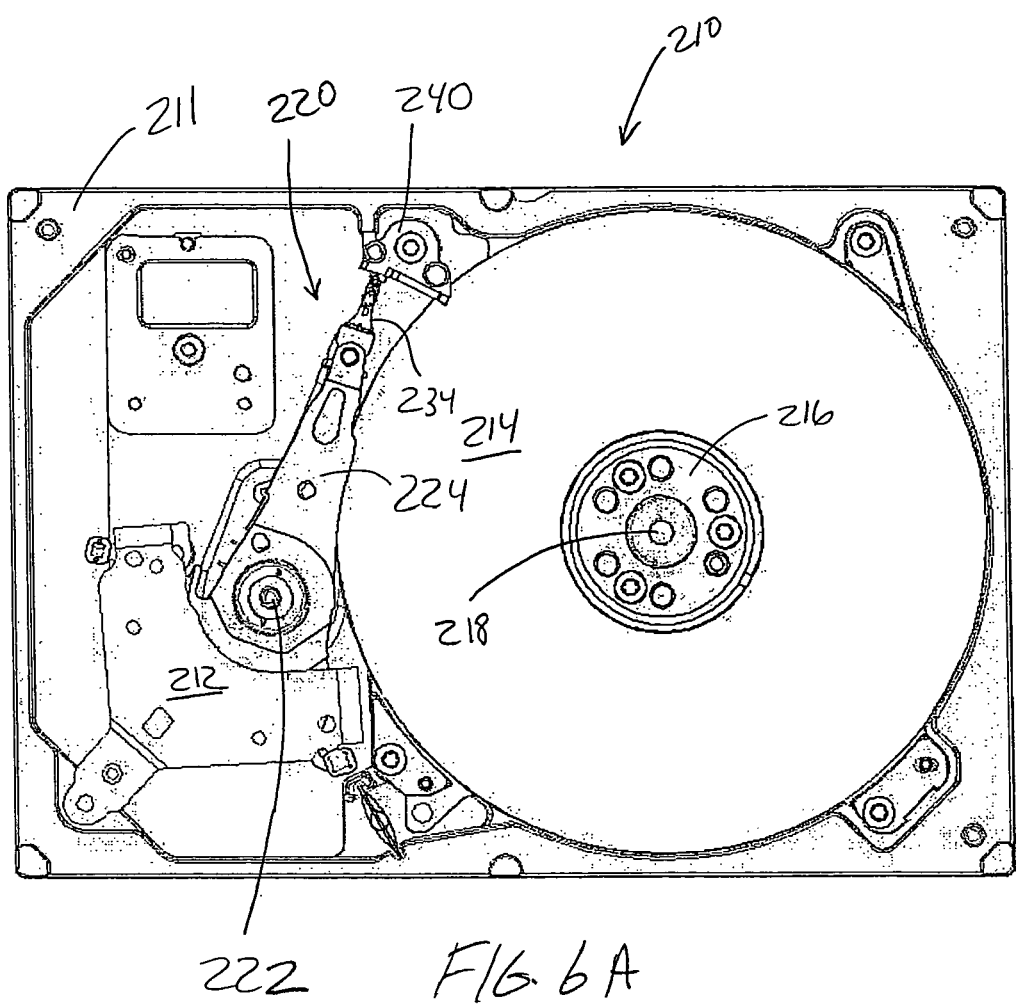
FIG. 6A is a plan view of another disk drive that may be adapted to include a disk drive load/unload ramp with integrated air features.
Figure 6B:
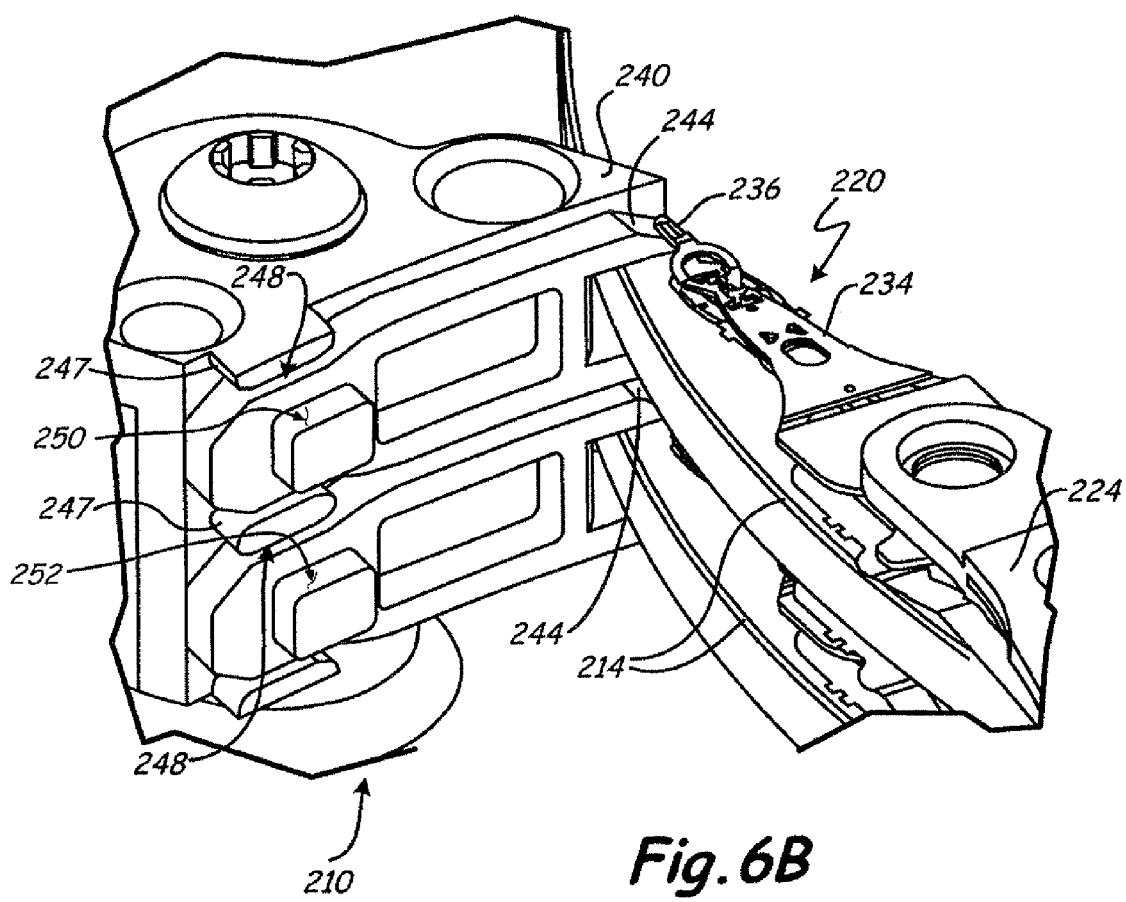
FIG. 6B is a perspective view of part of the disk drive of FIG. 6A when its head positioner assembly initially engages its load/unload ramp for a parking operation.
Figure 6C:
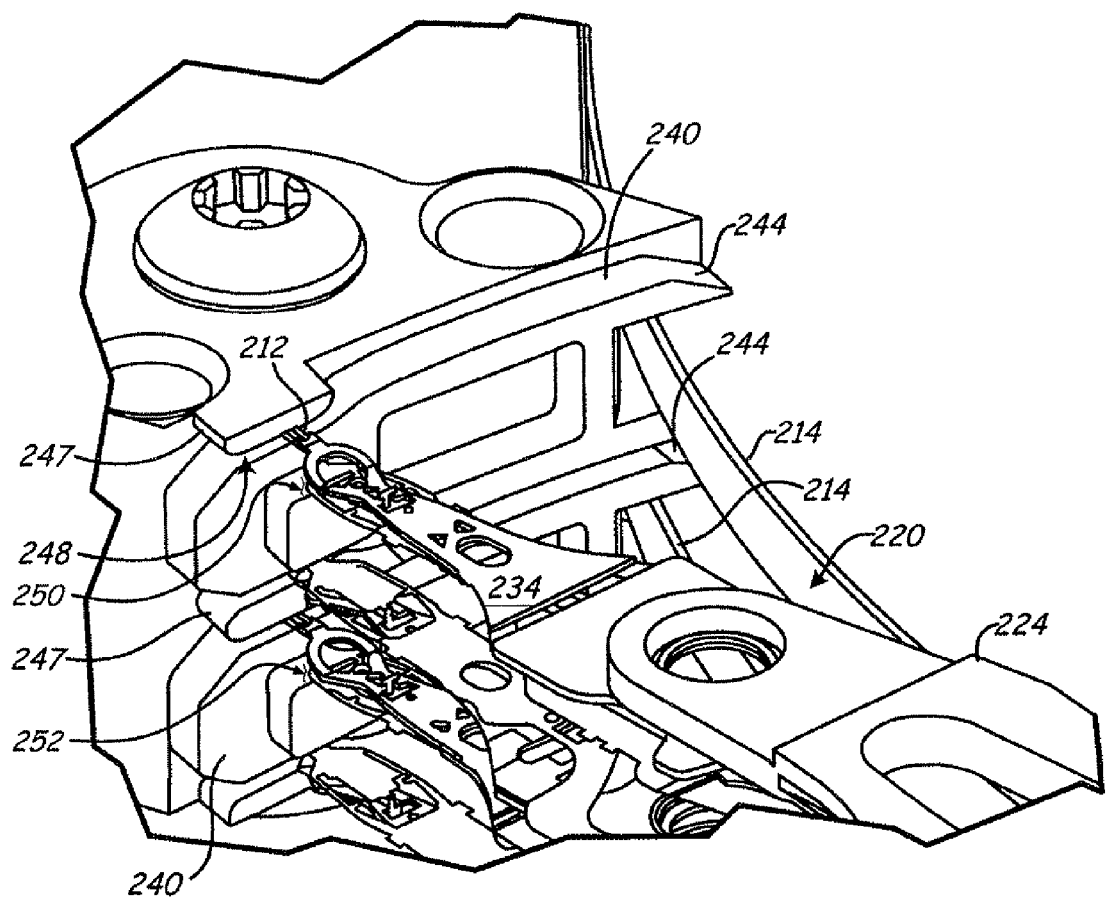
FIG. 6C is a perspective view of part of the disk drive of FIG. 6A, after the parking of its head positioner assembly on the load/unload ramp.
Figure 7A:
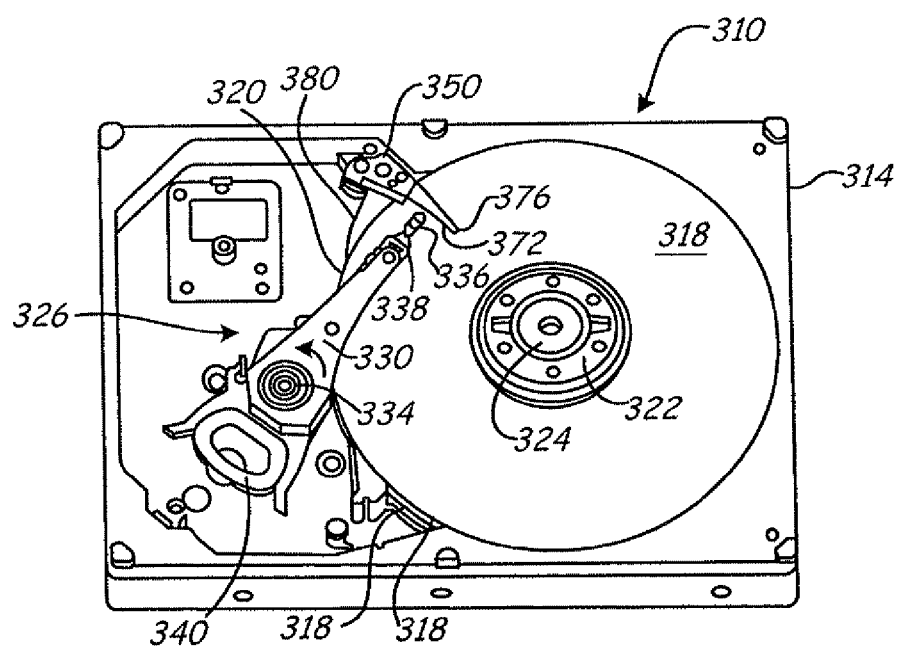
FIG. 7A is a top view of one embodiment of a disk drive that uses a load/unload ramp with integrated air features.
Figure 7B:
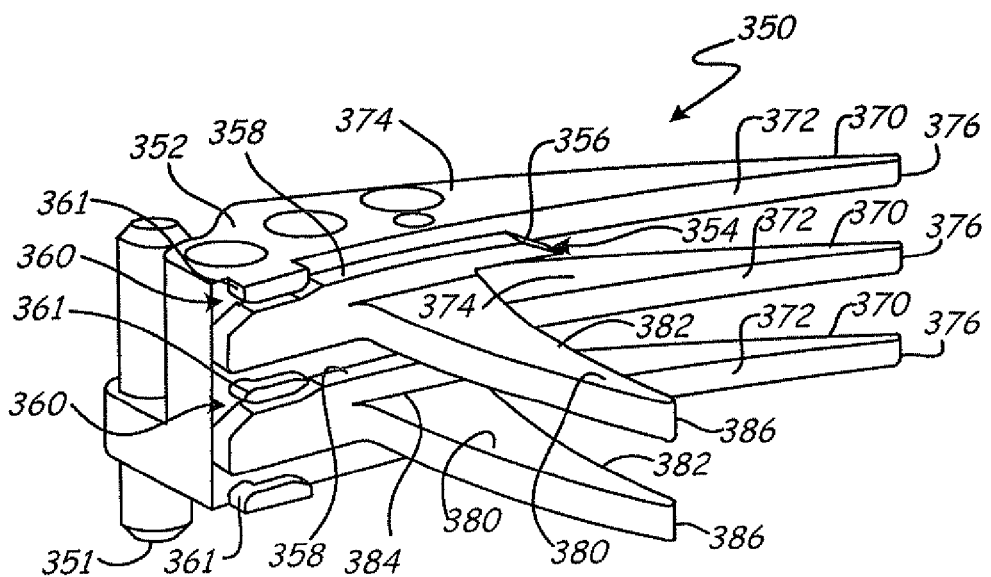
FIG. 7B is a perspective view of the load/unload ramp from the disk drive of FIG. 7A.
Figure 7C:
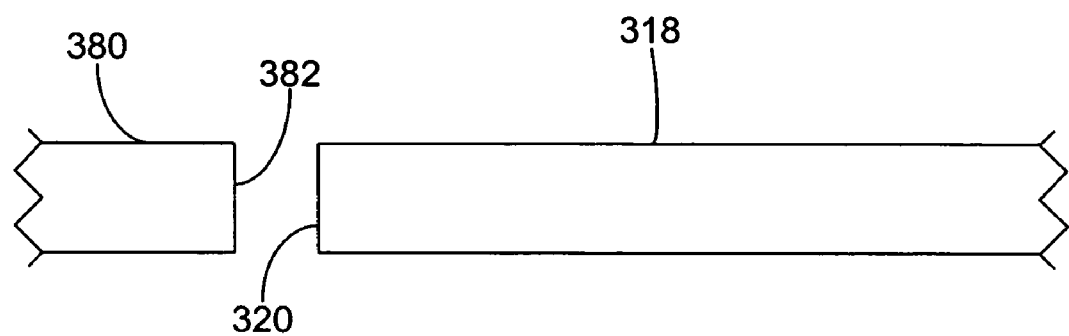
FIG. 7C is a cutaway view that illustrates the position of one of the disk extenders used by the load/unload ramp in relation to a perimeter of its corresponding data storage disk, from the disk drive of FIG. 7A.
Figure 7D:
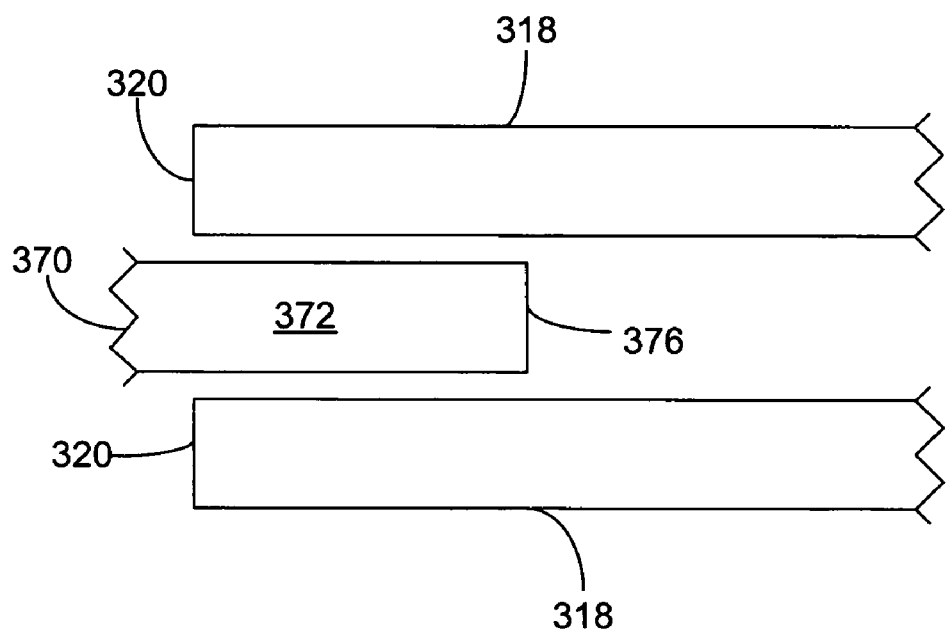
FIG. 7D is a cutaway view that illustrates one of the air dams used by the load/unload ramp in relation to a corresponding pair of data storage disks, from the disk drive of FIG. 7A.

Another embodiment of a disk drive 210 is illustrated in FIGS. 6A-C. This disk drive 210 also may be adapted to incorporate a load/unload ramp with integrated air features in accordance with FIGS. 7A-D, FIGS. 8A-B, and FIGS. 9A-B, such adaptations not being known to be in the prior art. The disk drive 210 generally includes a base plate 211. A cover (not shown) is typically disposed atop the base plate 211 and is detachably attached thereto to define an enclosed space for the various disk drive components. The disk drive 210 further includes multiple data storage disk 214 of any appropriate computer-readable data storage media. The data storage disks 214 are rotated by a spindle motor shaft 218 of a spindle motor, and are coupled therewith by a disk clamp 216.

The disk drive 210 also includes a head positioner assembly 220 which moves about a pivot bearing 222, which in turn is rotatably supported by the base plate 211 of the disk drive 210 and/or cover. This head positioner assembly 220 generally includes a plurality of rigid actuator arms 224 which each extend radially relative to the pivot bearing 222.

A suspension or load beam 234 is appropriately mounted to each actuator arm 224, and includes a lift tab 236 on its distal end or on a distal end of a flexure that may be used to interconnect a slider (e.g., slider 42; slider 140) and the corresponding suspension 234. The lift tab 236 may be of any appropriate size/shape/configuration. A slider is appropriately interconnected with each suspension 234 at a location that is "spaced back" from its corresponding lift tab 236, or generally in direction of the pivot bearing 222. Each suspension 234 and its corresponding slider again are commonly referred to as a "head-gimbal assembly." In any case, a "lower" or ABS surface of each slider faces its corresponding data storage disk 214, and includes a read/write head of any appropriate type (e.g., giant magnetoresistive (GMR)) for exchanging information with its corresponding data storage disk 214.

A voice coil motor (VCM) 212 of the disk drive 210 at least operatively interfaces with the head positioner assembly 220. This VCM 212 generally imparts motion to the head positioner assembly 220 to position the head 238 at the desired radial location of the data storage disk 214. The VCM 212 generally consists of a magnet(s) and a coil (not shown). The VCM 212 is disposed on the opposite side of the pivot bearing 222 in relation to the various suspensions 234.

The disk drive 210 also includes a load/unload ramp 240 that is disposed beyond a perimeter of the various data storage disks 214 and that has a plurality of vertically spaced cam or unloading surfaces 244 which slope both away from the corresponding data storage disk 214 and away from the base plate 211 of the disk drive 210 so as to dispose each slider and its corresponding data storage disk 214 in spaced relation when the head positioner assembly 220 is in a "parked" position (e.g., when disk drive operations have been terminated), as shown in FIGS. 6A and 6C. The cam or unloading surface 244 may be of any appropriate shape. One or more features may also be incorporated into the load/unload ramp 240 to provide at least some type of "lock" for the head positioner assembly 220 in its parked position. Typically the load/unload ramp 240 is mounted to the base plate 211 in any appropriate manner (e.g., using one or more screws that threadably engage with the base plate 211).

Parking generally entails the VCM 212 moving the head positioner assembly 220 in the direction of the load/unload ramp 240 such that each lift tab 236 engages its corresponding cam or unloading surface 244 of the load/unload ramp 240 (FIG. 6B). Continued movement of the head positioner assembly 220 forces each slider away from its corresponding data storage disk 214 by the interaction of the corresponding lift tab 236 with the corresponding cam or unloading surface 244 of the load/unload ramp 240. Movement of the head positioner assembly 220 is then terminated with the lift tab 236 remaining in contact with the load/unload ramp 240, which maintains a degree of separation between each slider and its corresponding data storage disk 214. A "notch" 248 may be formed in the load/unload ramp 240 for each lift tab 236 to at least somewhat "lock" the corresponding lift tab 236, and thereby the head positioner assembly 220, in this position (FIG. 6C). A first ledge 247 protrudes from the body adjacent the "notch" 248. This is commonly referred to as a "parked" position for the head positioner assembly 220. Sometimes the head or heads are referred to as being "parked" at this time as well. As shown in FIGS. 6B, 6C, there are second ledges 250, 252 that are positioned to underlie the "parked" position of heads (such as head 152 positioned by positioner 156 in FIG. 5).

Another embodiment of a disk drive 310 is illustrated in FIGS. 7A-D, and which uses a load/unload ramp with integrated air features. The disk drive 310 generally includes a disk drive to housing of any appropriate configuration that defines an enclosed space for the various disk drive components. Here, the housing includes a base plate 314 that is typically detachably interconnected with a cover (e.g., cover 12). The disk drive 310 further includes a plurality of data storage disks 318 of any appropriate computer-readable data storage media, and that are spaced in a first dimension (e.g., a vertical dimension when the base plate 314 is disposed on a horizontal surface). Each of the two major surfaces or primary data storage surfaces of each data storage disk 318 may include a plurality of concentrically disposed tracks for data storage purposes. In any case, each disk 318 is mounted on a hub by a disk clamp 322, and the hub is rotatably interconnected with the disk drive base plate 314 and/or cover. A spindle motor rotates the hub and attached clamp 322 about an axis coinciding with a shaft 324 of the spindle motor to simultaneously spin the data storage disks 318 at an appropriate rate.

The disk drive 310 also includes a head positioner assembly 326, which in turn includes a plurality of rigid actuator arms 330 that are also spaced in the noted first dimension (e.g., vertically when the base plate 314 is disposed on horizontal surface). Any appropriate number of actuator arms 330 may be used by the disk drive 310. In any case, each actuator arm 330 is mounted on a pivot bearing 334. It should be appreciated that the actuator arms 330 could alternatively be mounted on or extend from a common actuator body, which in turn is mounted on the pivot bearing 334. Regardless, the various actuator arms 330 simultaneously pivot about the pivot bearing 334, which in turn is rotatably supported by the base plate 314 and/or cover of the disk drive 310.

Movement of the head positioner assembly 326 is provided by an appropriate head stack assembly drive source, such as a voice coil motor or the like (e.g., VCM 62). The voice coil motor may be characterized as a rotational drive source for the disk drive 310. The voice coil motor is a magnetic assembly that controls the movement of the head positioner assembly 326 under the direction of control electronics (e.g., control electronics 66). Typical components of the voice coil motor are a coil 340 that may be mounted on the head positioner assembly 326 (on the opposite side of the pivot bearing 334 in relation to the actuator arms 330), and a separate voice coil motor magnet assembly that is disposed above and below this coil 340 (e.g., upper and lower VCM magnet assemblies 64). The VCM magnet assemblies will typically be mounted on the housing in a fixed position, with the upper VCM magnet assembly being appropriately supported above the lower VCM magnet assembly when the base plate 314 is disposed on a horizontal surface.

What may be characterized as a head-gimbal assembly or HGA 336 is typically interconnected with each actuator arm 330 and includes a load beam or suspension 338 that is attached to the free end of its corresponding actuator arm 330 or actuator arm tip, and cantilevers therefrom. One or more actuator arms 330 could have a single head-gimbal assembly 336 mounted thereon, one or more actuator arms 330 could have a pair of head-gimbal assemblies 336 mounted thereon, or both. Any appropriate number of head-gimbal assemblies 336 may be used by the disk drive 310. Typically there will be a separate head-gimbal assembly 336 for each primary data storage surface being used by the disk drive 310. The head-gimbal assemblies 336 may be of any appropriate configuration.

All HGAs 336 are part of the head positioner assembly 326. Typically the suspension 338 of each HGA 336 is biased at least generally toward its corresponding disk 318 by a spring-like force. A slider (e.g., slider 42) is disposed at or near the free end of each suspension 338. A head positioner of the type discussed in relation to the head-gimbal assembly 100 of FIG. 5 could be used by its HGAs 336, although such is not required. For instance, the HGAs 336 need not use a microactuator for their corresponding slider. What is commonly referred to in the art as the "head" (e.g., head 44) is appropriately mounted on or integrated with the slider and is used in disk drive read/write operations. Various types of read/write technologies may be utilized by the slider head. In any case, the biasing forces exerted by the suspension 338 on its corresponding slider thereby attempt to move the slider in the direction of its corresponding data storage disk 318. Typically this biasing force is such that if the slider were positioned over its corresponding data storage disk 318 and without the disk 318 being rotated at a sufficient velocity, the slider would be in contact with the disk 318.

The disk drive 310 also includes an integral or one-piece load/unload ramp 350 that is used for parking operations, namely to park the various heads of the disk drive 310 at the end or termination of normal disk drive operations. That is, the load/unload ramp 350 does not include any joint of any kind. Generally, the load/unload ramp 350 includes a body 352, one or more head load/unload sections 354, and a pair of integrated air features in the form of one or more air dams 370 and one or more disk extenders 380. The air dams 370 and the disk extenders 380 are integrally formed with the body 352 of the load/unload ramp 350. Therefore, there is no joint of any kind between the body 352 and any of the various head load/unload sections 354, there is no joint of any kind between the body 352 and any of the various air dams 370, and there is also no joint of any kind between the body 352 and any of the various disk extenders 380. In one embodiment, the load/unload ramp 350 is a molded part (e.g., injection molded), although any fabrication technique that will allow the load/unload ramp 350 to be in the form of a one-piece, integral structure may be utilized.

The load/unload ramp 350 includes a plurality head load/unload sections 354 in the illustrated embodiment and that are spaced in the noted first dimension (e.g., vertically spaced when the base plate 314 is disposed on a horizontal surface). Any appropriate number of head load/unload sections 354 may be utilized by the load/unload ramp 350. Typically there will be a designated head load/unload section 354 for each head-gimbal assembly 336 used by the disk drive 310. Each head load/unload section 354 is integrally formed with the body 352 of the load/unload ramp 350 and may be of any appropriate size, shape and/or configuration. That is, there is no joint of any kind between the body 352 and any of the head load/unload sections 354 of the load/unload ramp 350.

The various head load/unload sections 354 of the load/unload ramp 350 are of a common structure, and therefore only one need be described. The head load/unload section 354 includes a calming or inclined surface 356. The lift tab of each head-gimbal assembly 336 (e.g., similar to the lift tab 236 of the head-gimbal assembly of FIG. 6B) will eventually engage the inclined surface 356 of the corresponding head load/unload section 354 of the load/unload ramp 350 as the head positioner assembly 326 rotates in the direction of the load/unload ramp 350 at the end of normal disk drive operations (in the direction indicated by the arrow in FIG. 7A). Continued rotation of the head positioner assembly 326 in this same direction and with the lift tab of each head-gimbal assembly 336 engaging its corresponding inclined surface 356 will move the slider and read/write head of each head-gimbal assembly 336 away from its corresponding data storage disk 318 (e.g., to dispose each slider and its corresponding data storage disk 318 in vertically spaced relation when the base plate 314 of the disk drive 310 is disposed on a horizontal surface). The lift tab of each head-gimbal assembly 336 will eventually reach and then advance along a transition, surface 358 of the corresponding head load/unload section 354 during continued rotation of the head positioner assembly in the direction of the arrow in FIG. 7A, and until each lift tab reaches the locking section 360 of its corresponding head load/unload section 354 where rotation of the head positioner assembly 326 may then be terminated. Various ledges 361 protrude from the body adjacent the locking sections 360. The various locking sections 360 provide at least some resistance to a rotation of the head positioner assembly 326 in the opposite direction of the arrow in FIG. 7A (e.g., to reduce the potential of the head positioner assembly 326 being rotated so as to dispose the slider/head of each head-gimbal assembly 336 onto its corresponding disk 318 prior to initiating normal disk drive operations or prior to the data storage disks 318 reaching a certain rotational speed (e.g., particularly when the data storage disks 318 are not rotating at all)).

The load/unload ramp 350 includes a plurality of air dams 370 in the illustrated embodiment and that are spaced in the noted first dimension (e.g., vertically spaced when the base plate 314 is disposed on a horizontal surface). Any appropriate number of air dams 370 may be utilized by the disk drive 310. Each air dam 370 is also integrally formed with the body 352 of the load/unload ramp 350. That is, there is no joint of any kind between the body 352 and any of the air dams 370 of the load/unload ramp 350.

Each air dam 370 extends from the body 352 in the direction of the various data storage disks 318. That is, each air dam 370 cantilevers from the body 352 of the load/unload ramp 350 and includes both a fixed end 374 (at its juncture with the body 352) and a free or distal end 376. One air dam 370 will typically be disposed above (spaced from) the uppermost data storage disk 318 of the disk drive 310 when the base plate 314 is disposed on a horizontal surface. One air dam 370 will also typically be disposed between each adjacent pair of data storage disks 318 of the disk drive 310, and further will be spaced from each of the data storage disks 318 of its corresponding pair. One air dam 370 may also be disposed below the lowermost data storage disk 318 of the disk drive 310 when the base plate 314 is disposed on a horizontal surface.

The various air dams 370 are disposed "downstream" of the head positioner assembly 326, such that a point on a given data storage disk 318 will first pass its corresponding head-gimbal assembly 336, and will thereafter pass its corresponding air dam 370. Stated another way, the data storage disks 318 of the disk drive 310 will rotate clockwise in the view presented in FIG. 7A. Each air dam 370 may be of any appropriate configuration, including having each air dam 370 being of a common configuration as shown in the illustrated embodiment although such is not required. The purpose of the various air dams 370 is to have an effect on the airflow associated with the primary data storage surfaces of the corresponding data storage disk(s) 318 (e.g. to disrupt/hinder airflow generated by the rotating data storage disks 318). This is principally provided by an air dam surface 372 of each air dam 370. These air dam surfaces 372 each may be of any appropriate size, shape, and/or configuration and/or may be disposed in any appropriate orientation. In the illustrated embodiment, each air dam surface 372 is oriented at least substantially perpendicularly to the primary data storage surfaces of the various data storage disks 318 (although other orientations may be appropriate), and each air dam surface 372 is also arcuately-shaped or concavely-shaped between the fixed end 374 and the distal end 376 of its corresponding air dam 370 (although other contours may be appropriate).

The various air dams 370 limit or break up the tangential airflow velocity at the outer diameter of the disks 318. This in turn will then suppress undesirable fluttering of the various disks 318, of the various HGAs 336, and of the various actuators arms 330. Any length for the air dams 370 that adequately provides this functionality may be used. Other considerations regarding the length of the air dams 370 include: 1) the desire to maintain dimensional stability; 2) the desire to not adversely affect assembly of the load/unload ramp 350 to a significant degree; and 3) the desire to avoid contact with the disks 318 during a non-operational shock event. This being said, in one embodiment each of the air dams 370 extend to about the midpoint between the innermost date track of the corresponding disk 318 (ID data track) and the outermost data track of the disk (OD data track) of this disk 318.

With regard to the thickness of the air dams 370, the following consideration are relevant: 1) the air dams 370 should not contact the disks 318 during normal disk drive operations; 2) the air dams 370 preferably do not contact the disks 318 during an operational shock event (a shock event during disk drive operations when the disks 318 are spinning); 3) the air dams 370 preferably should not contact the data area of the disks 318 during a non-operational shock event (while the disks 318 are not spinning); and 4) the air dams 370 can be used as travel limiters by contacting the disks 318 on the chamfer at the perimeter of the disks 318.

The load/unload ramp 350 also includes a plurality of disk extenders 380 in the illustrated embodiment and that are spaced in the noted first dimension (e.g., vertically spaced when the base plate 314 is disposed on a horizontal surface). Any appropriate number of disk extenders 380 may be utilized by the disk drive 310. Each disk extender 380 is also integrally formed with the body 352 of the load/unload ramp 350. That is, there is no joint of any kind between the body 352 and any of the disk extenders 380 of the load/unload ramp 350.

Each disk extender 380 extends from the body 352 in a manner so as to be disposed beyond a perimeter 320 of the corresponding data storage disk 318. That is, each disk extender 380 cantilevers from the body 352 of the load/unload ramp 350 and includes both a fixed end 384 (at its juncture with the body 352) and a free or distal end 386. One disk extender 380 will typically be disposed beyond the perimeter 320 of each data storage disk 318 used by the disk drive 310. Typically there will be only a relatively small gap between each disk extender 380 and its corresponding data storage disk 318, although any appropriate spacing may be utilized.

Each disk extender 380 may be of any appropriate configuration, including having each disk extender 380 being of a common configuration as shown in the illustrated embodiment although such is not required. The purpose of the various disk extenders 380 is to have an effect on the airflow associated with the various data storage disks 318 at their respective perimeters 320 (e.g., to change the boundary conditions at the perimeter 320 of each data storage disk 318; to reduce turbulent flow conditions at the perimeter 320 of each data storage disk 318). This is principally provided by a disk extender surface 382 of each disk extender 380. Each disk extender surface 382 is disposed beyond and aligned with the perimeter 320 of the corresponding data storage disk 318, and further is at least substantially parallel with the perimeter 320 of its corresponding data storage disk 318. Stated another way, each disk extender surface 382 is radially aligned with a corresponding portion of the perimeter 320 of its corresponding data storage disk 318. As such, each disk extender surface 382 is arcuately-shaped or concavely-shaped between its fixed end 384 and its distal end 386.

Typically each disk extender surface 382 will have a vertical extent or thickness that is at least substantially the same as the vertical extent or thickness of its corresponding data storage disk 318. Stated another way and for the case when the base plate 314 is disposed on a horizontal surface, the upper surface of each disk extender 380 may be at least substantially coplanar with one of the primary data storage surfaces of its corresponding data storage disk 318, while the lower surface of each disk extender 380 may be at least substantially coplanar with the other primary data storage surface of its corresponding data storage disk 318. Other thicknesses may be appropriate for the various disk extenders 380.

The various disk extenders 380 limit the amount of airflow around at least that portion of the perimeter of the disks 318 that could have an adverse effect on the HGAs 336. That is, the disk extenders 380 address the turbulence at the perimeter of the disks 318 over a region that benefits the HGAs 336. Any configuration/relative positioning of the disk extenders 380 that provides this functionality may be utilized. Generally: 1) the disk extenders 380 should be at least generally the same thickness as their corresponding disks 318; 2) the disk extenders 380 should be positioned close to the perimeter of their corresponding disk 318 but without contacting the same (typically dictated by tolerances, for instance having a space between the disk extenders 380 and the perimeter of their corresponding disk that is ½ mm or less); and 3) the length of the disk extenders 380 preferably encompasses a projection of the corresponding HGA 336 to the perimeter of its corresponding data storage disk 318 (e.g., so that the disk extenders 380 are disposed outwardly of their corresponding HGA 336 during normal disk drive operations). Other considerations with regard to the configuration of the various disk extenders 380 include: 1) there should be adequate clearance between the disk extenders 380 and the arms 330/HGAs 336; 2) the arms 330/HGAs 336 should not contact the disk extenders 380 during load/unload operations for the specified operational shock for the drive; and 3) the arms 330/HGAs 336 should not contact the disk extenders 380 for the specified non-operational shock for the drive.

The load/unload ramp 350 reduces the part count and simplifies the fabrication of the disk drive 310. It is typical to separately fabricate a load/unload ramp, a disk extender assembly, and an air dam assembly. As noted above, the load/unload ramp 350 uses an integral structure that may be formed by a single molding operation. Therefore, a single structure (the load/unload ramp 350) provides three separate functions (a load/unload function, and two separate airflow management functions).

The load/unload ramp 350 may be incorporated into the disk drive 310 in any appropriate manner. In the illustrated embodiment, the load/unload ramp 350 includes a post 351 that allows the load/unload ramp 350 to be pivoted into the installed position by positioning the post 351 in an appropriate recess in the base plate 314 and/or cover. Thereafter, the load/unload ramp may be appropriately secured to the base plate 314 and/or cover (e.g., using one or more screws). It should be appreciated that any appropriate motion may be used to installed the load/unload ramp 350, including a linear motion and that certain changes may need to be made to the ramp load/unload 350 to accommodate the manner of installing the same.

Figure 8A:
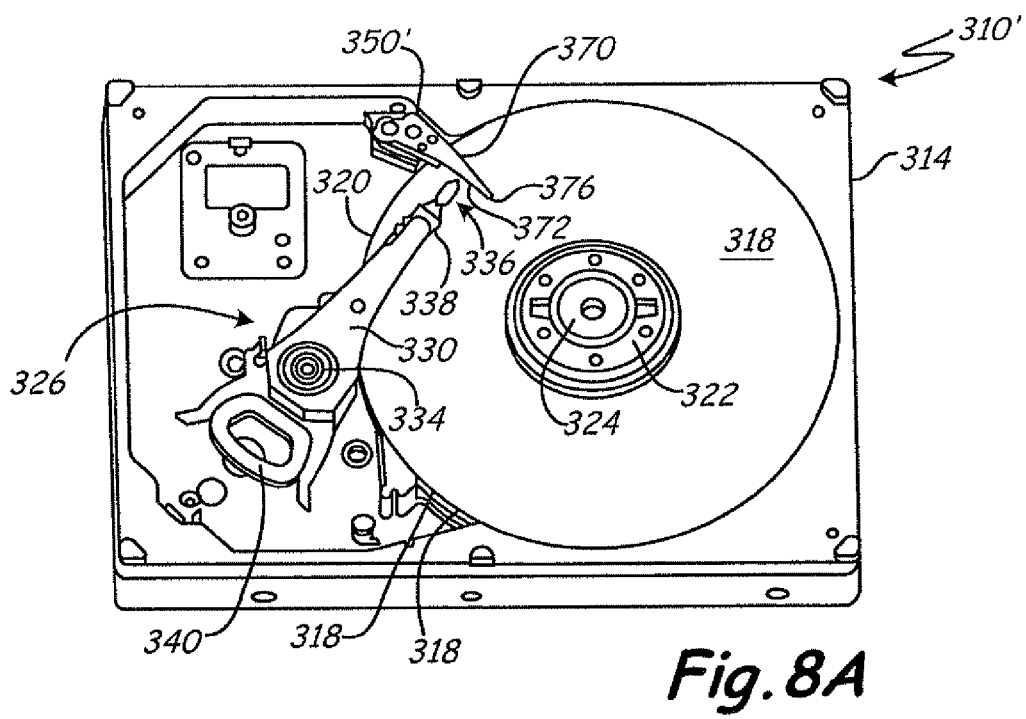
FIG. 8A is a top view of one embodiment of a disk drive that uses a load/unload ramp with an integrated air dam.
Figure 8B:
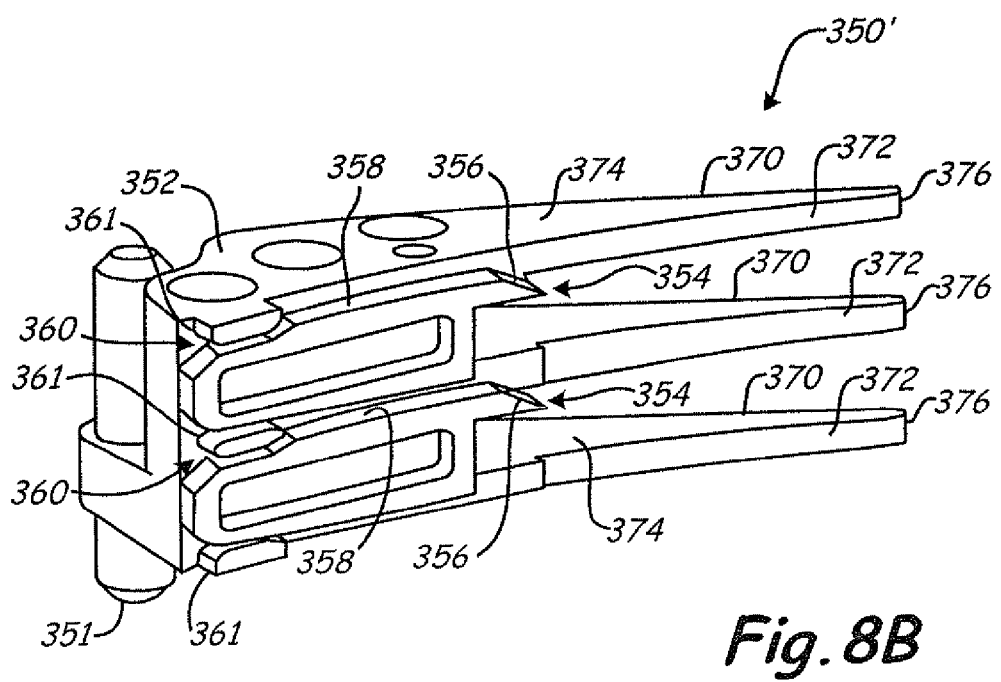
FIG. 8B is a perspective view of the load/unload ramp from the disk drive of FIG. 8A.

Another embodiment of a disk drive 310' is illustrated in FIGS. 8A-B, and uses a load/unload ramp with integrated air features of a first type. Components of the disk drive 310' of FIGS. 8A-B that correspond with a component of the disk drive 310 of FIGS. 7A-D are identified by the same reference numeral, and the corresponding discussion presented above remains equally applicable. Those common components that differ in at least some respect are further identified by a "single prime" designation. The principal difference between the disk drive 310 of FIGS. 7A-D and the disk drive 310' of FIGS. 8A-B is that the load/unload ramp 350' of the disk drive 310' does not utilize any disk extenders 380.

Figure 9A:
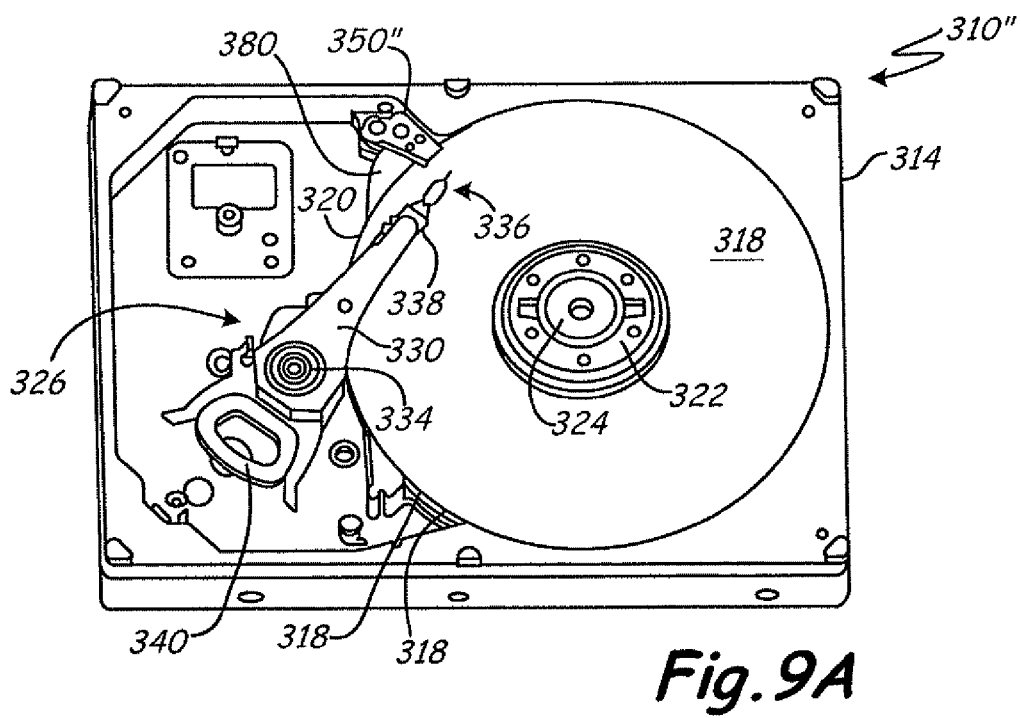
FIG. 9A is a top view of one embodiment of a disk drive that uses a load/unload ramp with an integrated disk extender.
Figure 9B:
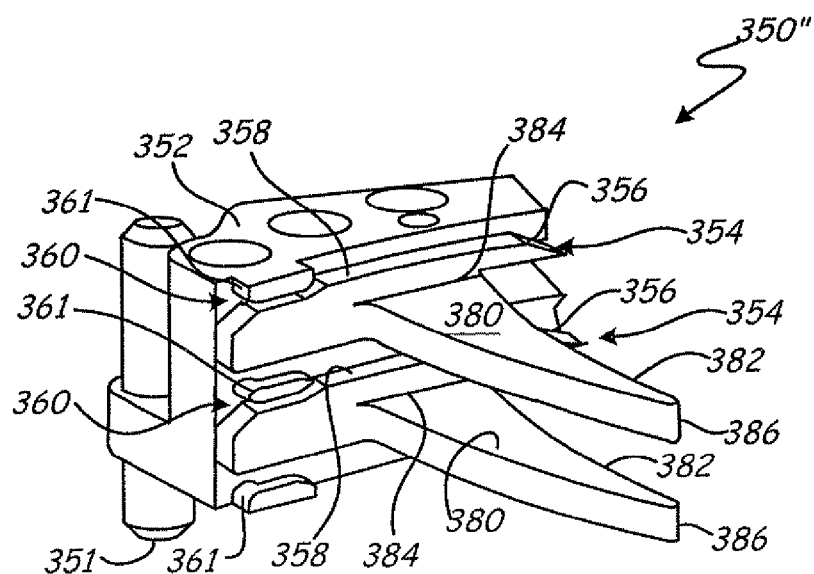
FIG. 9B is a perspective view of the load/unload ramp from the disk drive of FIG. 9A.

Another embodiment of a disk drive 310" is illustrated in FIGS. 9A-B, and uses a load/unload ramp with integrated air features of a second type. Components of the disk drive 310" of FIGS. 9A-B that correspond with a component of the disk drive 310 of FIGS. 7A-D are identified by the same reference numeral, and the corresponding discussion presented above remains equally applicable. Those common components that differ in at least some respect are further identified by a "double prime" designation. The principal difference between the disk drive 310 of FIGS. 7A-D and the disk drive 310" of FIGS. 9A-B is that the load/unload ramp 350" of the disk drive 310" does not utilize any air dams 370.

The foregoing description of the present invention has been presented for purposes of illustration and description. Furthermore, the description is not intended to limit the invention to the form disclosed herein. Consequently, variations and modifications commensurate with the above teachings, and skill and knowledge of the relevant art, are within the scope of the present invention. The embodiments described hereinabove are further intended to explain best modes known of practicing the invention and to enable others skilled in the art to utilize the invention in such, or other embodiments and with various modifications required by the particular application(s) or use(s) of the present invention. It is intended that the appended claims be construed to include alternative embodiments to the extent permitted by the prior art.

What is claimed is:

1. A disk drive load/unload ramp, comprising:
    a body that includes a bottom mounting surface that defines a mounting surface plane and a protruding post that protrudes below the mounting surface plane and that is adapted to pivot in a recess of a disc drive base plate surface that is at the mounting surface plane;
    a first head load/unload section that is joined to the body and that includes a transition surface having first and second arcuate edges that extend between a camming surface and a locking section of the first head load/unload section, the locking section comprising a first protruding lift-tab-support ledge that defines a park position notch between the first ledge and the first head load/unload section;
    a second protruding ledge that is positioned to underlie the parked position notch in alignment with a head in a park position;
    a first air dam that extends outwardly from the body, the air dam abutting the first arcuate edge of the transition surface;
    a first disk extender that in turn comprises a disk extender surface, wherein when said disk drive load/unload ramp is installed in a disk drive, and 1) said first head load/unload section interacts with a corresponding head-gimbal assembly of the disk drive to move a head of the corresponding head-gimbal assembly away from its corresponding data storage disk of the disk drive during a parking operation; 2) said first air dam is aligned with and spaced from a primary data storage surface of at least one data storage disk of the disk drive; and 3) said disk extender surface is disposed beyond and aligned with a perimeter of a corresponding data storage disk of the disk drive and further is at least substantially parallel with the perimeter of its corresponding data storage disk.

2. The disk drive load/unload ramp of claim 1, comprising a molded part.

3. The disk drive load/unload ramp of claim 1, comprising a plurality of said first head load/unload sections that are spaced in a first dimension, a plurality of said first air dams that are spaced in said first dimension, and a plurality of said first disk extenders that are spaced in said first dimension.

4. The disk drive load/unload ramp claim 1, wherein said disk extender surface is disposed radially outwardly from the perimeter of its corresponding data storage disk.

5. The disc drive load/unload ramp of claim 1, wherein the second protruding ledge comprises a substantially flat second ledge surface portion, the first protruding lift-tab-support ledge comprises a substantially flat first ledge surface portion, and the substantially flat second ledge surface portion is parallel with the substantially flat first ledge surface portion.

6. A disk drive load/unload ramp, comprising:
    a body that includes a bottom mounting surface that defines a mounting surface plane and a protruding post with a beveled end that protrudes below the mounting surface plane to pivot in a recess of a disk drive base plate surface that is at the mounting surface plane;

a first head load/unload section that is joined to the body and that includes a transition surface having first and second arcuate edges that extend between a camming surface and a locking section of the head load/unload section, the locking section comprising a first protruding lift-tab-support ledge that defines a park position notch between the first protruding lift-tab-support ledge and the first head load/unload section;

a second protruding ledge that is positioned to underlie the locking section in alignment with a head in a park position; and a first disk extender that in turn comprises a disk extender surface, wherein said body, said first head load/unload section, said first and second protruding ledges and said first disk extender are in the form of a one-piece structure, wherein when said disk drive load/unload ramp is installed in a disk drive, and 1) said first head load/unload section interacts with a corresponding head-gimbal assembly of the disk drive to move a head of the corresponding head-gimbal assembly away from its corresponding data storage disk of the disk drive during a parking operation; 2) said disk extender surface is disposed beyond and aligned with a perimeter of a corresponding data storage disk of the disk drive and further is at least substantially parallel with the perimeter of its corresponding data storage disk; and the post has a shape that is rotatable in a recess in a base plate to pivot the load/unload ramp into an installed position.

7. The disk drive load/unload ramp of claim 6, comprising a molded part.

8. The disk drive load/unload ramp of claim 6, further comprising a plurality of said first head load/unload sections that are spaced in a first dimension, as well as a plurality of said first disk extenders that are also spaced in said first dimension.

9. The disk drive load/unload ramp of claim 6, wherein said disk extender surface is disposed radially outwardly from the perimeter of its corresponding data storage disk.

10. The disk drive load/unload ramp of claim 6, further comprising a first air dam, wherein when said disk drive load/unload ramp is installed in a disk drive, said first air dam is aligned with and spaced from a primary data storage surface of at least one data storage disk of the disk drive.

11. The disk drive load/unload ramp of claim 10, further comprising a plurality of said first head load/unload sections that are spaced in a first dimension, a plurality of said first air dams that are spaced in said first dimension, and a plurality of said first disk extenders that are spaced in said first dimension.

12. The disc drive load/unload ramp of claim 6, wherein the second protruding ledge comprises a substantially flat second ledge surface portion, the first protruding lift-tab-support ledge comprises a substantially flat first ledge surface portion, and the substantially flat second ledge surface portion is parallel with the substantially flat first ledge surface portion.

13. A disk drive load/unload ramp, comprising:

a body that includes a bottom mounting surface that defines a mounting surface plane and a protruding post that protrudes below the mounting surface plane and that is adapted to pivot in a recess of a disc drive base plate that is at the mounting surface plane;

a head load/unload section that is joined to the body and that includes a transition surface having first and second arcuate edges that extend between a camming surface and a locking section of the head load/unload section, the locking section comprising a first protruding lift-tab-support ledge that defines a park position notch between the first protruding lift-tab-support ledge and the head load/unload section;

a second protruding ledge that is positioned to underlie the parked position notch in alignment with a head in a park position;

a disc extender that has an arcuate shape that is tapered and that extends outwardly from the body; and an air dam that has an arcuate shape that is tapered and extends outwardly from the body, the arcuate shape of the air dam abutting the first arcuate edge of the transition surface.

14. The disk drive load/unload ramp of claim 13 wherein the post comprises a cylindrical post surface extending to a beveled end.

15. The disk drive load/unload ramp of claim 13 wherein the head load/unload section comprises a ledge that protrudes adjacent the locking section.

16. The disk drive load/unload ramp of claim 13 comprising a plurality of head load/unload sections spaced apart from one another by a separation space, and the disk extender being positioned in the separation space.

17. The disc drive load/unload ramp of claim 13, wherein the second protruding ledge comprises a substantially flat second ledge surface portion.

18. The disc drive load/unload ramp of claim 17, wherein the first protruding lift-tab-support ledge comprises a substantially flat first ledge surface portion.

19. The disc drive load/unload ramp of claim 13, wherein the substantially flat second ledge surface portion is parallel with the substantially flat first ledge surface portion.

* * * * *